Jan. 5, 1926.  
J. CLARK ET AL  
1,568,268  
WROUGHT METAL REPAIR DEVICE FOR PIPE LINES  
Filed August 25, 1925  
3 Sheets-Sheet 2

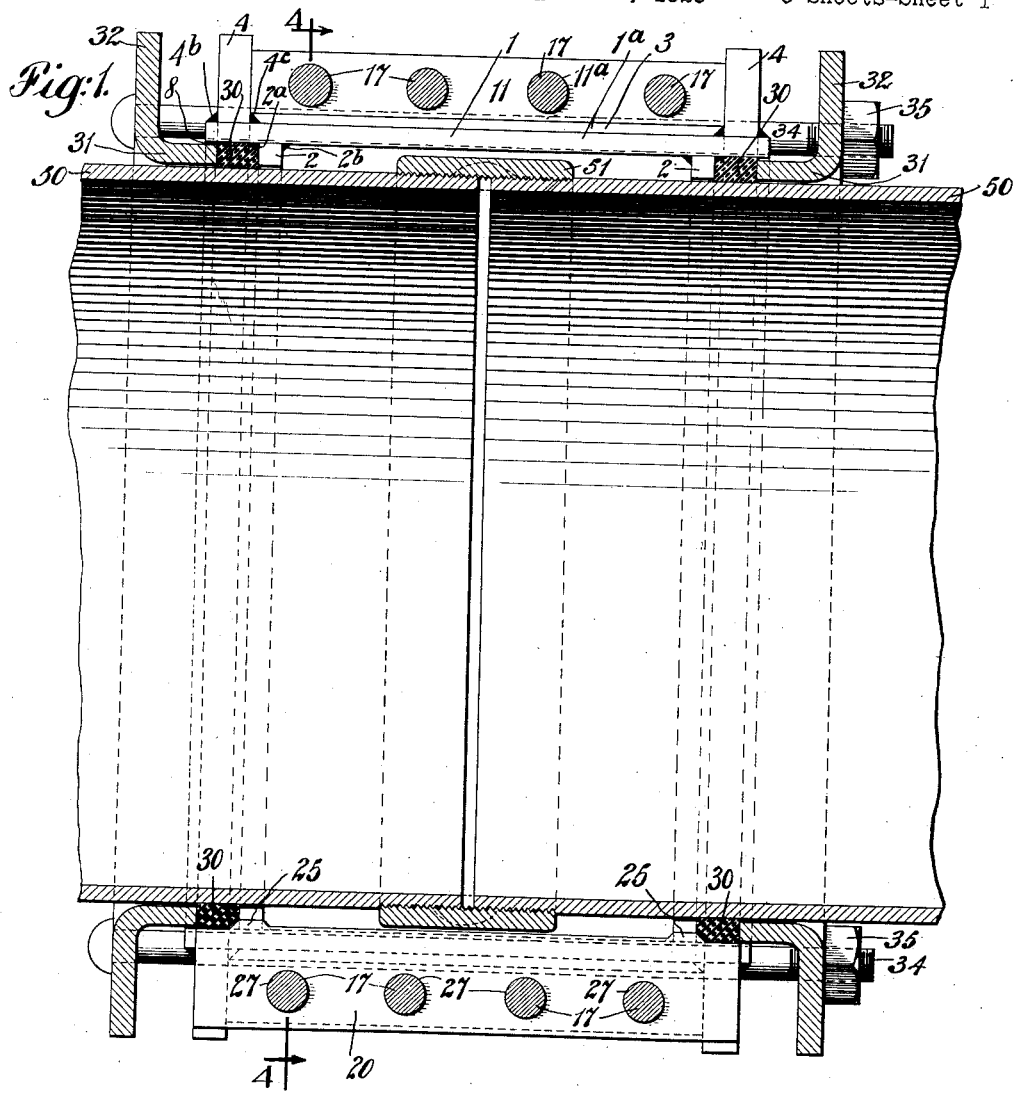

Inventor  
James Clark and  
E. Walborn  
By their Attorney  
Louis Prevost Whitaker

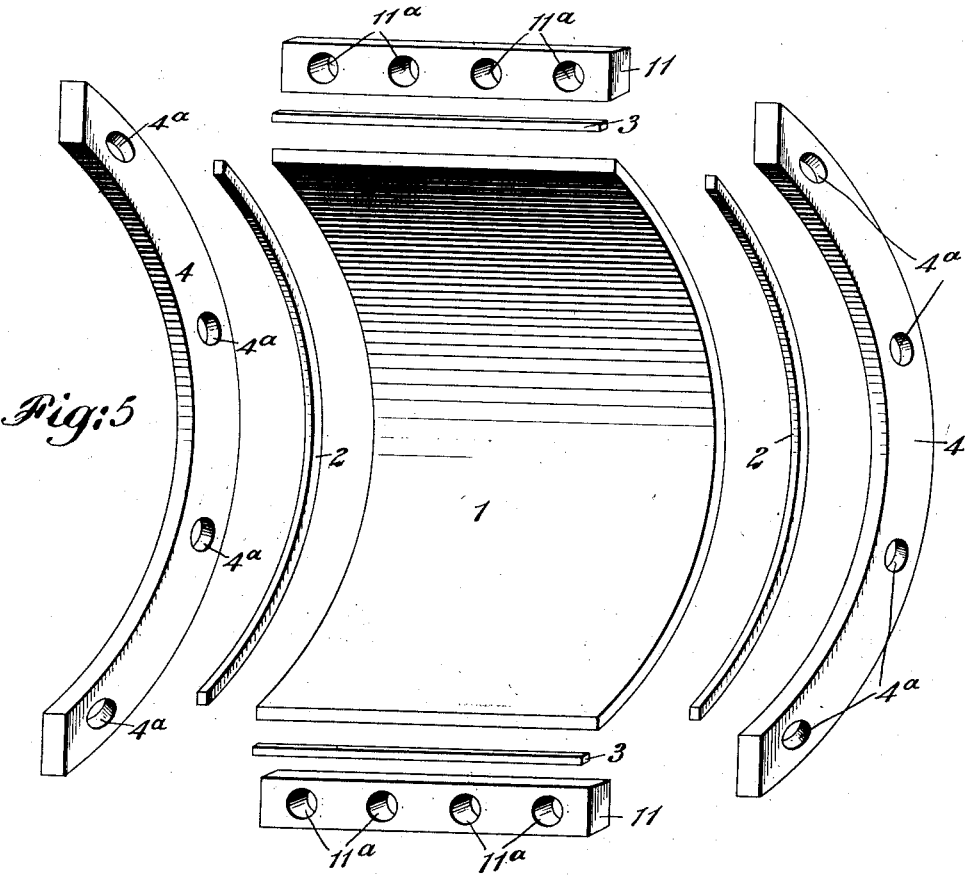
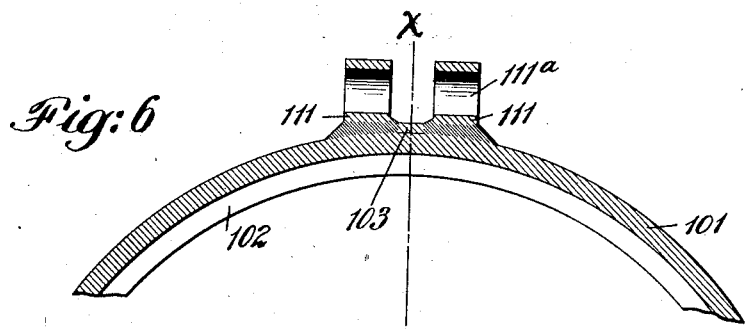

Patented Jan. 5, 1926.

1,568,268

UNITED STATES PATENT OFFICE.

JAMES CLARK AND JOSEPH E. WALBORN, OF BRADFORD, PENNSYLVANIA, ASSIGNORS TO S. R. DRESSER MANUFACTURING COMPANY, OF BRADFORD, PENNSYLVANIA, A CORPORATION OF PENNSYLVANIA.

WROUGHT-METAL REPAIR DEVICE FOR PIPE LINES.

Application filed August 25, 1925. Serial No. 52,346.

*To all whom it may concern:*

Be it known that we, JAMES CLARK and JOSEPH E. WALBORN, citizens of the United States, residing at Bradford, in the county of McKean and State of Pennsylvania, have invented certain new and useful Improvements in Wrought-Metal Repair Devices for Pipe Lines; and we do hereby declare the following to be a full, clear, and exact description of the invention, such as will enable others skilled in the art to which it appertains to make and use the same.

Our invention consists in the novel features hereinafter described, reference being had to the accompanying drawing which illustrates one embodiment of the invention, selected by us for purposes of illustration, and the said invention is fully disclosed in the following description and claims.

The object of our invention is to provide a repair device or split sleeve which is employed principally to stop leaks in pipe lines without necessitating the cutting off of the flow of material through the line or disturbing the pipe sections adjacent to the leak. These leaks usually occur at a joint in the pipe line, as where adjacent pipe sections are connected by a screw collar or other form of coupling and a leak has developed between the collar and one of the pipe sections, or by injury to or defect in the screw collar or other form of pipe coupling. The repair sleeve is therefore constructed of sufficient diameter internally to enclose the entire joint, that is to say, the screw collar or other coupling, and the portions of the pipe sections adjacent thereto, the sleeve being made in sections divided longitudinally and secured together by bolts, to facilitate placing the sleeve over the defective joint without disturbing the pipe lines, the said sleeve having packing between the longitudinal edges of the sleeve and the said sleeve being employed in conjunction with clamping rings or followers, also made in sections and properly secured together, which are employed to compress end packings into packing recesses provided at the ends of the sleeve for the purpose of making a tight joint between the sleeve and the pipe which it encloses on opposite sides of the enclosed pipe coupling or broken place in the pipe to be repaired. As these repair sleeves are employed frequently in places extremely difficult of access, and are necessarily handled to a large extent in placing and assembling them in the pipe line by the hands of the operators, in other words by man power alone, it is extremely important that these sleeves should be made as light as possible, while at the same time they must have great strength to withstand the internal pressures to which they are subjected, running frequently from three or four hundred pounds to as high as one thousand pounds per square inch, and they must also be entirely impervious, as otherwise they could not be employed safely to stop a leak. It has been found extremely desirable therefore, to make these split sleeves entirely of wrought metal in order to obviate the possibility of porosity of material, which renders the use of cast metal parts objectionable, and the use of wrought metal materially decreases the weight of the sleeves and enables their parts to be more readily placed in position and secured together by hand in difficult places in a pipe line.

In the Letters Patent of the United States, No. 1,478,172, granted to James Clark, December 18, 1923, there is shown and described a wrought metal sleeve of the general character above indicated, formed of separate parts united by welding, brazing or otherwise, but preferably by electric welding, in which semi-cylindrical sleeve sections are provided at each end with semi-circular end pieces welded thereto at their exterior peripheral portions and having packing recesses adjacent to their inner edges to receive the end portions which, under the compression of the followers, effect a tight joint between the pipe section and said end portions. It has been found, however, that sometimes in the welding of these end portions to the sleeve sections, the welds were not completely gas tight and in order to insure the delivery of a perfect product, it is necessary in the manufacture of these sleeves to test each one for defects in welding under conditions of pressure substantially identical with those in which the sleeves are intended to be used in the line. This necessitates the assembling of parts of every single sleeve manufactured, in conjunction with pipe sections, and subjecting each individual sleeve so assembled to a pressure test in connection with suitable testing apparatus in order to determine whether or not there are any leaks in the welded portions of the sleeve, after which each sleeve must be taken apart and removed from the pipe sections. This naturally adds very materially to the cost of production of these sleeves.

The object of our present invention which has been arrived at as a result of much study and experiment, is to provide a wrought metal sleeve of this general character, formed of separate pieces united by welding and to so construct and arrange the different parts of the sleeve that the welded joints will be in such locations with respect to the end packing recesses that when the end packings are in place and are compressed by the followers, the packing material, usually rubber, will not only make a tight joint between the pipe section and sleeve, but will at the same time make an absolutely tight joint between the pipe section and the cylindrical section forming part of the sleeve, and will enclose the welded joints, so that whether the welded joints are gas tight or not, the sleeve will be absolutely tight when assembled for use upon the pipe line. Our improved construction produces a sleeve which can be manufactured and delivered without any preliminary testing, thus saving materially in the cost of production, while at the same time the sleeve is rendered absolutely gas tight when placed in operative relation to the pipe line for the repair of a joint or otherwise. In other words, the end packing rings are made to seal the welded portions within the semi-cylindrical sleeve section, and therefore there can be no leaks at such welds.

Referring to the accompanying drawings, which illustrate one embodiment of our invention, designed for the repair of leaky joints in pipe lines, in which the sections are connected by screw collars, Fig. 1 is a vertical sectional view showing the sleeve applied around a screw collar pipe joint, the side rubber at the upper portion of the figure being removed.

Fig. 2 is a partial sectional view of the same, taken on the line 2—2, of Fig. 3, at a point adjacent to one of the clamping bolts which is shown in elevation.

Fig. 5 is a view showing the various parts of one-half of the sleeve in separated relation before welding them together.

Fig. 6 is a partial sectional view of a portion of a sleeve made in accordance with our invention and illustrating the procedure where the parts are united to a cylinder by welding, the cylinder being subsequently sawed into separate portions or sections, after welding, on the line indicated by the dotted line $x$—$x$.

Figure 3:
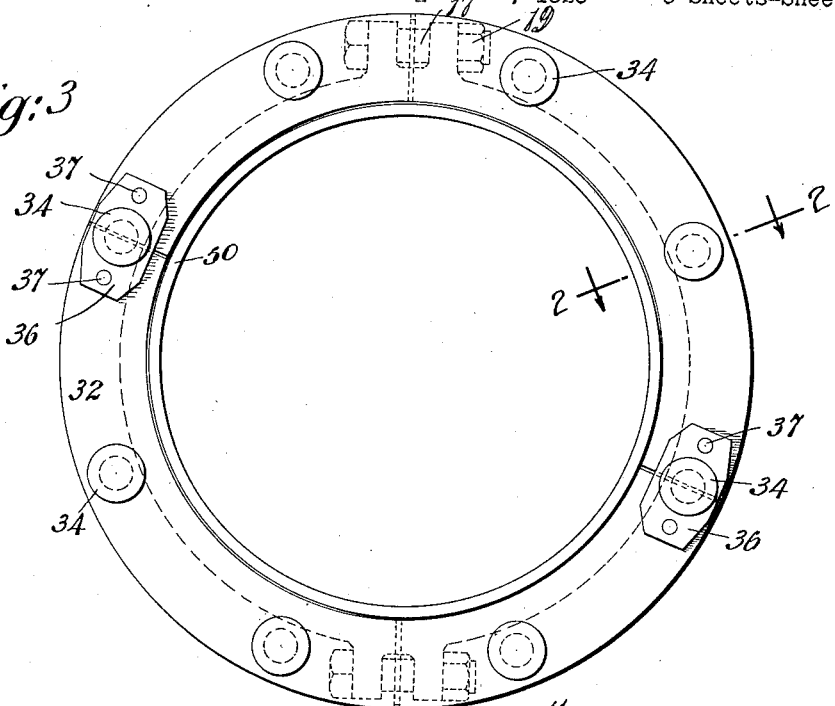
Fig. 3 is an end view of the sleeve, the adjacent pipe section being shown in elevation.

In carrying our invention into effect, our improved sleeve is formed preferably in two sections, each of which comprises a plurality of separate parts illustrated in Fig. 5, in separated relation, which are united by welding or brazing, and preferably welding, by the use of an electric welding machine. Each section of the sleeve comprises the following elements or members.

1 represents the shell or body portion, which is formed of wrought metal, preferably steel, and bent or curved into the form of a segment of a cylinder, 2—2 represent end pieces also formed of wrought metal, preferably steel, substantially rectangular in cross section and bent into semi-circular form, the exterior curved face of each end piece being curved to fit the inner face of the curved body segment, 1, and being welded thereto at a distance back from each end of the body section, 1, preferably by the use of the welding machine and the formation of the fillets indicated at $2^a$ and $2^b$, the inner curved faces of said end pieces forming the pipe opening of the sleeve and being formed in a circle, very slightly larger than the outside diameter of a pipe. This construction provides at each end of the body section, 1, a packing recess indicated at 8, at the inner end of which is the fillet, $2^a$, the said packing recesses being designed to accommodate the end packing rings indicated at 30. It will immediately become apparent that the compression of the packing rings, 30, within said packing recesses, 8, at each end of the sleeve, will cause the packing to firmly engage the pipe section indicated at 50, the inner face of the body or sleeve section 1, and the outer faces of the end pieces, 2—2, and fillet, $2^a$, thus not only effecting a tight joint between the sleeve and the pipe section, 50, when the sleeve is operatively installed, but also preventing the possibility of any leakage through the welds between the end pieces, 2—2, and the body section, 1. The half section of the sleeve also includes narrow edge reinforcing strips, indicated at 3—3, and shown detached in Fig. 5, which are welded to the longitudinal edges of the body section, 1, for the purpose of increasing the width of the meeting faces of said sections, which engage the side packings, as hereinafter described.

The sections, 1, of the main body or cell, are also provided adjacent to, but at a slight distance from each edge, with a side flange, 11, provided with bolt holes, $11^a$, for the short transversely extending connecting bolts, these side flanges being also shown detached in Fig. 5. The side flanges, 11, are preferably welded to the body sections, 1, in any usual or desired manner, but preferably by the electric welding machine.

For the purpose of reinforcing the marginal end portions 1, exterior to the packing recesses, 8, in order to preclude the possibility of spreading on account of internal pressure within said packing recesses, we prefer to provide the sections, 1, with an exterior, semi-circular reinforcing flange, indicated at 4, provided with bolt holes, 4ª, for permitting the passage of the longitudinal clamping bolts or through bolts, said flanges, 4, being also welded to the exterior of the sections, 1, and preferably by the electric welding machine, and the formation of fillets, indicated at 4ᵇ and 4ᶜ.

Figure 4:
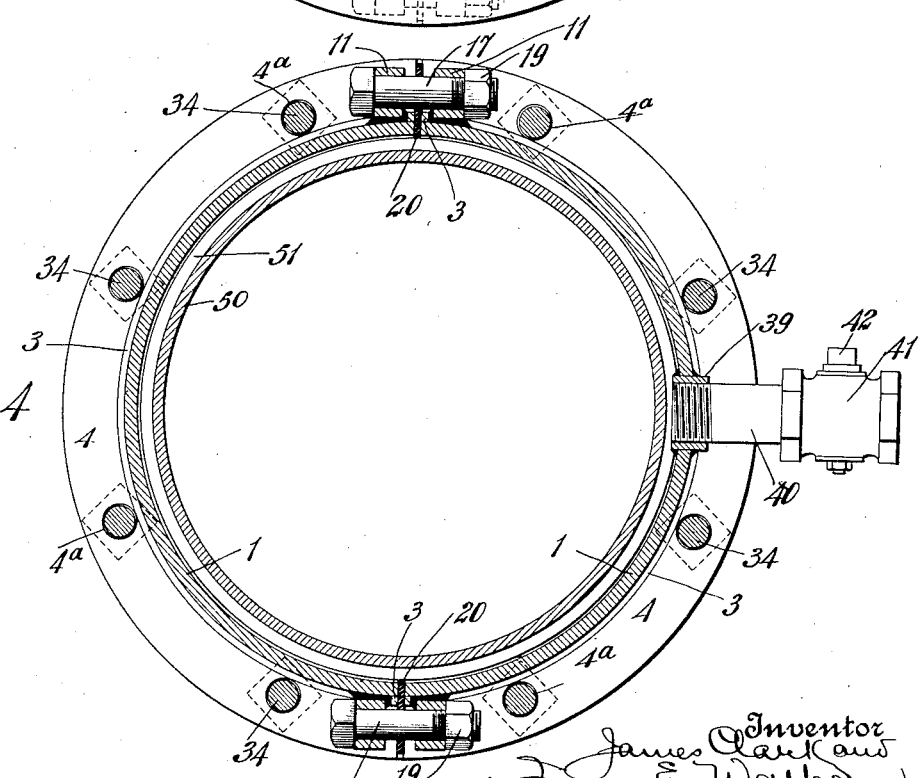
Fig. 4 is a transverse section on the line 4—4, of Fig. 1.

We have heretofore stated that the main body of the sleeve is formed of two semi-cylindrical sections, 1—1. These sections will be formed of flat plates and molded or bent into semi-cylindrical form, or we may form them by taking a complete cylinder, as a section of tube or pipe of the required length and diameter, and sawing it or cutting it longitudinally into two semi-cylindrical parts. Where this is done, we find it convenient to weld upon the exterior of the cylinder indicated at 101, in Fig. 6, a longitudinal strip, indicated at 103, of double the width of the edge strip, 3, and also to weld to the exterior of the cylinder the side flanges, 11, and weld within the same annular end pieces, 102, after which the cylindrical structure is cut or sawed into two pieces on the line indicated by the dotted line, x—x, in Fig. 6. The exterior reinforcing flange may be welded in place either before or after the cylinder 101 is cut in two, and may in some instances be dispensed with altogether. This method illustrated in Fig. 6 is a convenient one for obtaining our improved structure, but it may be obtained in the manner previously described, or in any other desired way within the scope of our invention.

Where the reinforcing flanges, 4—4, are employed, the side flanges, 11, will be fitted inside of the flanges, 4, so as to permit the latter to extend entirely around the marginal portions of the cell or body, 1. It will be understood that the half sleeves, or sections, previously described, are to be united so as to be gas tight and this is accomplished by means of side rubbers or packings, one of which is indicated at 20 in Fig. 1, both of these side packings being indicated in section in Fig. 4. These side rubbers, or packings, consist of a flat sheet of rubber of suitable thickness, which lies between the meeting faces of the half sleeves or sections, indicated at 1ª, which, as before described, constitutes the edges or faces of the section 1, and the edge strip, 3. The side rubbers or packings, also extend between the ends of the reinforcing flanges, 4, and have inwardly extending portions on their inner edges, indicated at 25, to engage the end packing rings, 30, and also to fit between the end faces of the end pieces, 2, as will be readily seen by reference to the lower portion of Fig. 1. Said side rubbers or packings are also provided with a plurality of bolt holes, indicated at 27, through which the side bolts, 17, are passed. This is not absolutely necessary, but it greatly facilitates placing these rubbers in proper position in assembling the sleeve around a leaking joint of a pipe line and clamping the parts together. The side, or transverse bolts, 17, are provided with suitable nuts, 19, for clamping the side packings or rubbers, between the two halves of the sleeve.

In connection with the sleeve and end packings we employ two followers or clamping rings, each of which is provided with a cylindrical packing engaging portion, 31, and a perpendicular clamping flange portion, 32, provided with bolt holes, 33, the bolt holes, 33, being located so as to register with the bolt holes, 4ª, of the reinforcing flanges, 4. The followers are also made in two or more pieces and are provided with bridge pieces, 36, provided with bolts or pins, 37, to engage locking apertures in the segments of the followers in a manner similar to that illustrated in Letters Patent of the United States, granted to James C. Clark, No. 1,062,438, dated May 20, 1913, said bridge pieces being each provided with an aperture for the passage of a clamping bolt and the line of division between the segments of the clamping ring passing through certain of the bolt holes therein, as described in said Letters Patent, or the bridge pieces may be bolted, riveted, or otherwise secured to the segments of the followers in any desired manner. We prefer, however, to secure each bridge piece to one segment of the follower, so as to facilitate the assembly of the followers around the pipe sections, and to prevent the accidental separation of the bridge pieces from the segments of the followers in transportation, but this is not essential.

These repair sleeves are usually installed over a leaking coupling in a high pressure line from which gas or other fluid is escaping. In order to facilitate the application of our improved split sleeve and prevent the leaking high pressure fluid from blowing the packing out of position and interfering with the workmen, as the parts of the sleeve are tightened into position, it is desirable to provide the sleeve with means for relieving the pressure inside of it during the assembling and tightening of the parts. We therefore prefer to provide at least one of the body segments with a vent aperture, having a cut off valve which can be maintained in open position to allow escape of the gas or other fluid until after the parts of the sleeve have been assembled and tightened, when said sleeve may be closed to stop any further leakage. In this instance we have shown, in Fig. 4, for example, one of the body segments, 1, provided with a circular aperture bored therein, in which is fitted an internally screw threaded collar, 39, secured in position by welding or brazing, and into which is screwed a nipple, 40, to which is secured a cock or valve, 41, provided with a rotary plug, 42, which can be turned by means of a wrench or other suitable tool. This cock can remain open during the assembling and tightening of the parts and can then be turned off or closed after the sleeve has been made tight. If the sleeve is to be used in a position where the cock, 41, or its equivalent is not needed, the collar, 39, can be closed by an ordinary screw plug.

Assuming that a leaky joint has been discovered in a pipe line which it is desired to repair, an excavation is made around the leaky joint of sufficient size to permit insertion of the repair sleeve. The segments of the sleeve, provided with the side packings, before described, are placed around the pipe and the leaky coupling with the side packings in proper position between the two halves of the sleeve, which are bolted together by the bolts and nuts, 17, 19, thus making a tight joint between the segments of the sleeve. The end packings, 30, are then placed around the pipe sections. These are usually made in ring form and cut on a bevel at one point in the ring so as to permit them to be placed around the pipe and in the packing recess at each end of the sleeve. The followers are then placed around the pipe sections and assembled by means of their respective bridge pieces. The through bolts, 34, are then passed through the registering bolt holes, 33, and 4ª, of the followers or clamping rings, and the reinforcing flanges, 4, of the sleeve, and are provided with nuts, 35, which are drawn up, compressing the packings, 30, in the packing recesses and squeezing the end packing rings which are preferably made of rubber, against the inner faces of the sleeve sections, indicated at 50—50, and against the outer faces of the interior end pieces of the sleeve and against the fillets, 2ª, thereof, thus making a perfectly gas tight joint in each end of the sleeve between the pipe and sleeve, and also insuring against any possibility of leakage around the outer edge of the end pieces, 2, where they are welded to the interior of the sleeve sections, and at the same time making a perfectly gas tight joint by means of the side packings between the sections of the sleeve. Any leakage in or about the enclosed collar coupling indicated at 51 (or other type of coupling), will obviously be completely stopped, as any gas thereafter escaping will be confined within the split sleeve. As before stated, it is generally found convenient to provide the sleeve with a vent aperture and vent valve, as 41, for example, which is left open during the application of the sleeve and until it is entirely tightened up, after which the vent valve, as for example the plug valve, 42, is closed. This, however, is a mere matter of convenience of assembling and where the pressure is comparatively low, the vent valve may be dispensed with, and the vent aperture in the collar, 39, if provided, may be closed by an ordinary plug, or the vent aperture may be dispensed with altogether, if desired. It will also be understood that these repair sleeves can be employed to stop a leak due to an imperfection in the pipe itself, between joints or otherwise.

It will be noted that all the parts of our improved repair sleeve are formed of wrought metal and such parts will themselves be entirely impervious. This construction is very materially lighter than cast metal, our sleeve being approximately one-half the weight of a sleeve for the same sized pipe formed of cast metal. In some cases the reduction of weight is even greater, thus facilitating the transportation of the sleeve and the installation thereof, especially in remote localities and in places difficult of access. The parts of the sleeve may be separately formed in an economic manner and united by welding, and as the end pieces, 2, are located inside of the semi-cylindrical sleeve sections, and are welded thereto in such manner that the welds are at the inner ends of the end packing recesses of the sleeve, the end packing rings, when the sleeve is installed, will insure the absolute gas-tightness of the union between the end pieces and sleeve, regardless of any defects which may and indeed will occasionally occur in welding. This cheapens the cost of manufacture of our improved sleeve in two ways:

1. The welding can be performed in a cheaper manner because it is only necessary to weld for strength and not for gas-tightness, and 2. It is entirely unnecessary to give the sleeves any preliminary pressure tests before delivery and therefore the expense of assembling the sleeves and testing them on a pressure testing machine is also eliminated.

While we prefer to form the sleeve in two sections or halves, it is perfectly obvious that it could be made of three, four, or other number of sections, if this should become desirable, by properly constructing the various parts and providing the necessary side packings for the longitudinal joints in the sleeve.

What we claim and desire to secure by Letters Patent is:

1. In a wrought metal repair device for pipe lines, a split sleeve comprising a plurality of wrought metal body segments, each of which is provided at each end with a marginal portion comprising a segment of a cylinder, a wrought metal segment end piece welded to the inner face of each of said marginal portions of the body segments at a distance from the end face thereof, forming a packing recess of which marginal portions of the body segments form the outer wall, and the segmental end pieces form the inner ends, whereby the packing in said recesses will seal the welded joints between the said end pieces and body segments, and prevent leakage in cases of defective welding, means for securing said body segments together, and side packings for making tight joints between the longitudinal meeting edges of the body segments.

2. In a wrought metal repair device for pipe lines, a split sleeve comprising a plurality of wrought metal body segments, each of which is provided at each end with a marginal portion comprising a segment of a cylinder, a wrought metal segmental end piece, welded to the inner face of each of said marginal portions of the body segments at a distance from the end face thereof, forming a packing recess of which marginal portions of the body segments form the outer wall, and the segmental end pieces form the inner ends, whereby the packing in said recesses will seal the welded joints between the said end pieces and body segments, and prevent leakage in cases of defective welding, means for securing said body segments together and side packings for making tight joints between the longitudinal meeting edges of the body segments, and wrought metal reinforcing flange segments welded to the exterior of the marginal portions of each body segment between the universal plane of the end pieces and the end faces of the body segments, to prevent the spreading of the said marginal portions when the packings are compressed in said packing recesses.

3. In a wrought metal repair device for pipe lines, a split sleeve comprising a plurality of segments, each consisting of a wrought metal body segment of a cylinder, provided at each end with segmental pieces of wrought metal welded thereto on the inner side, at a distance back from the ends of the body segments, and forming packing recesses within the ends of the body segments, of which recesses the marginal portions of the body segments form the outer wall and the end pieces form the inner ends, said body segments being provided with side flanges adjacent to each of their longitudinal edges, side packings interposed between the meeting edges of said body segments, each of said body segments being also provided on the exterior of its marginal portions adjacent to each end with a segmental reinforcing flange, welded thereto, and having adjacent to its longitudinal edges a longitudinally extending side flange of wrought metal welded thereto and lying between said reinforcing flanges and provided with bolt holes, and bolts for connecting said side flanges of adjacent segments.

4. In a wrought metal repair device for pipe lines, a split sleeve comprising a plurality of segments, each consisting of a wrought metal body segment of a cylinder, provided at each of its longitudinal edges with a reinforcing strip, welded thereto, and having its face flush with the adjacent end face of the body segment, to increase the packing engaging width thereof, segmental end pieces welded to the interior of said body segments adjacent to but a distance back from the ends thereof, to form end packing recesses for the sleeve, of which the marginal portions of the body segments form the outer wall and said end pieces form the inner ends, said body segments being provided exteriorly between the transverse planes of said end pieces and the ends of the body segments, with reinforcing segments welded thereto and provided with bolt holes, and each body segment being provided adjacent to each of its longitudinal edges with a side flange of wrought metal, welded thereto, and provided with bolt holes, side packings interposed between the meeting edges of said body segments and the longitudinal reinforcing strips thereof, bolts and nuts connecting the side flanges of adjacent segments.

5. In a wrought metal repair device for pipe lines, a split sleeve comprising a plurality of segments, each consisting of a wrought metal body segment of a cylinder, provided at each of its longitudinal edges with a reinforcing strip, welded thereto, and having its face flush with the adjacent end face of the body segment, to increase the packing engaging width thereof, segmental end pieces welded to the interior of said body segments adjacent to but a distance back from the ends thereof, to form end packing recesses for the sleeve, of which the marginal portions of the body segments form the outer wall and said end pieces form the inner ends, said body segments being provided exteriorly between the transverse planes of said end pieces and the ends of the body segments, with reinforcing segments welded thereto and, provided with bolt holes, and each body segment being provided adjacent to each of its longitudinal edges with a side flange of wrought metal, welded thereto, and provided with bolt holes, side packings interposed between the meeting edges of said body segments and the longitudinal reinforcing strips thereof, bolts and nuts connecting the side flanges of adjacent segments, annular packings in said end packing recesses, a pair of followers formed in segmental sections and each provided with packing engaging portions, for engaging the packings in said end recesses, and with outwardly extending clamping flanges provided with bolt holes adapted to register with those in the reinforcing flanges, and a circular series of through bolts extending through the bolt holes in the flanges of both followers and through the bolt holes of said reinforcing flanges on the body segments registering therewith.

In testimony whereof we affix our signatures.

JAMES CLARK.
JOSEPH E. WALBORN.